Nov. 11, 1930.                    W. E. HOLLAND                        1,781,640
                                   ELECTRIC BATTERY
                               Filed Feb. 10, 1925           2 Sheets-Sheet 1

Inventor:
Walter E. Holland,
by his Attorneys,
Howson & Howson.

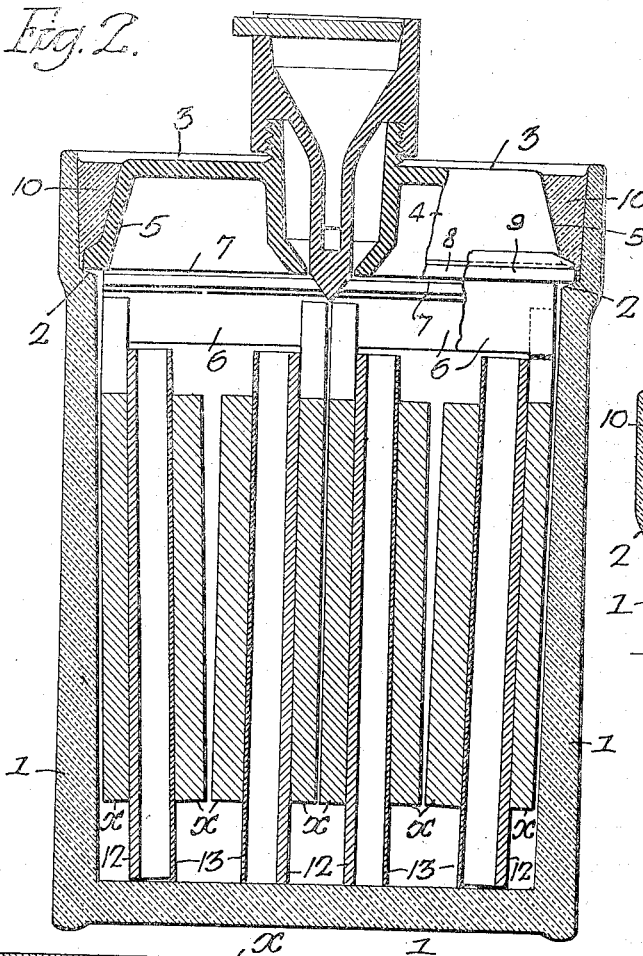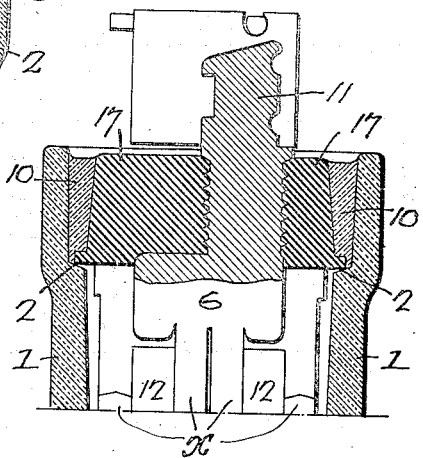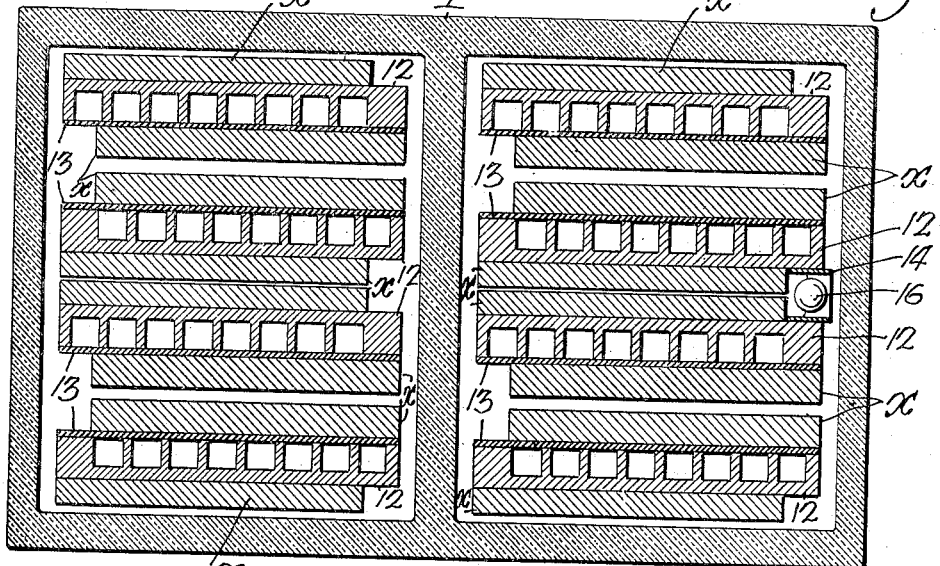

Patented Nov. 11, 1930

1,781,640

UNITED STATES PATENT OFFICE

WALTER E. HOLLAND, OF PHILADELPHIA, PENNSYLVANIA, ASSIGNOR TO PHILADELPHIA STORAGE BATTERY COMPANY, OF PHILADELPHIA, PENNSYLVANIA, A CORPORATION OF PENNSYLVANIA

ELECTRIC BATTERY

Application filed February 10, 1925. Serial No. 8,204.

One object of this invention is to provide an improved form of battery in which the plates or elements of opposite polarity are suspended within the jar or container.

Another object of the invention is to provide a staggered plate assembly whereby the vertical edges of the plates of opposite polarity are thrown out of line, thereby reducing to a minimum the chance for loosened active material to bridge or tree across the vertical edges of the separators and partially short circuit the plates.

A further object of the invention is to provide a plate assembly which permits mounting a charge indicator at the edge of certain plates without increasing the normal size or changing the regular shape of the jar or container.

Still another object of the invention is to provide a novel form of plate strap, terminal post and cover which with a novel jar formation make an improved form of suspension for the elements and provide means for tightly sealing the cell to prevent escape of acid by creepage at the post.

The invention further contemplates the provision of an improved plate assembly whereby the equivalent of very thick plates is obtained by using double plates of normal thickness; and the use therewith of similar single plates at the two ends of the element, thus balancing the plate capacity exactly throughout the elements without resort to the usual special thin outside plates.

Construction by means of which these and other objects are obtained is illustrated in the attached drawings, in which:

Fig. 2 is a transverse section on the line 2—2, Fig. 1;

Fig. 4 is a section on the line 4—4, Fig. 1, and

Fig. 5 is a transverse section through the upper portion of a cell illustrating a modification within the scope of the invention.

With reference to the drawings and more particularly to Figs. 1 to 4, inclusive, my battery may comprise the usual glass or other container or jar 1, the jar in the present instance comprising two separate chambers for the respective battery cells. Since the construction of the individual cells are identical, the present description will be confined to but one.

As shown in Fig. 2, I may provide my container along two opposite sides and near the top thereof with inner upturned shoulders 2 which function to support a cover member 3 and positive and negative battery elements, as hereinafter described. The cover member 3 which may be of molded hard rubber, I may form with depending side and end flanges 4 and 5, the bottoms of the end flanges resting as shown in Fig. 2 upon the shoulders 2 and the member 3 thereby being supported in the top of the container. As illustrated, the top of the cover member may be approximately on a level with the top edge of the jar, although the exact position is not material.

Figure 1:
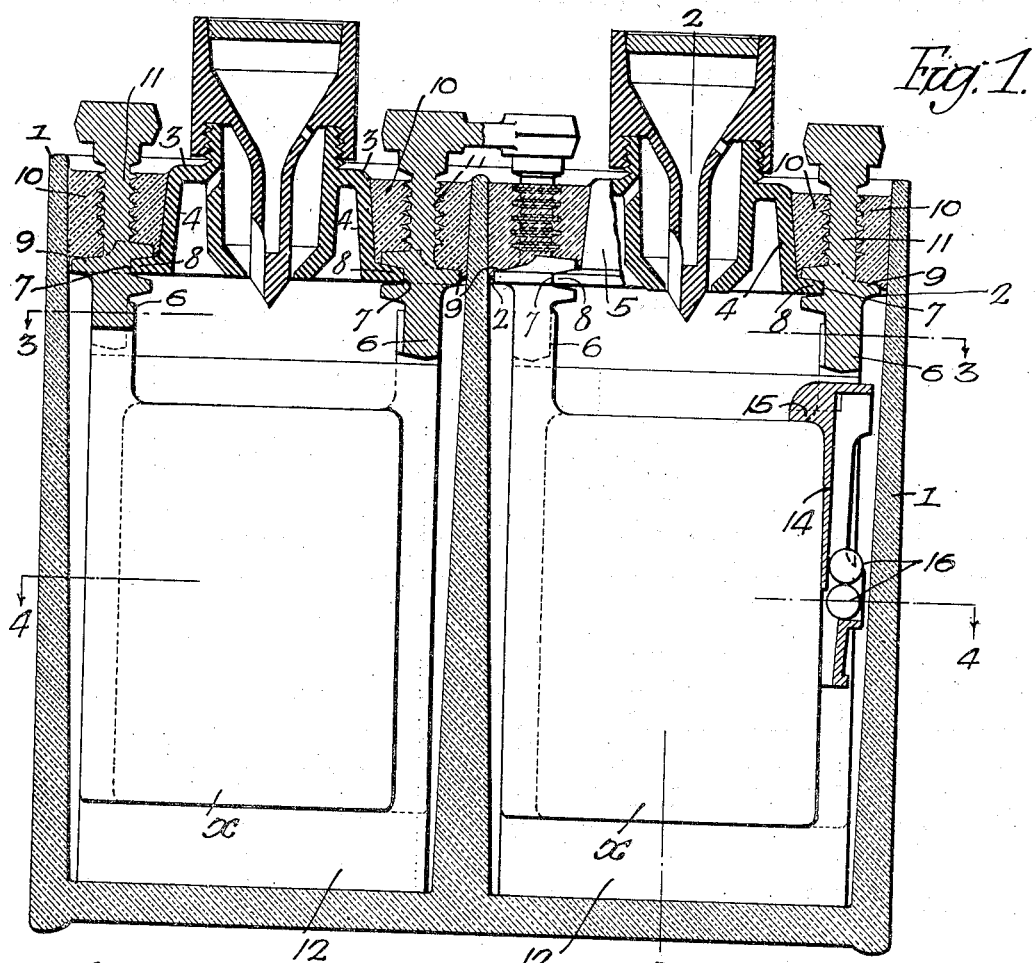
Figure 1 is a longitudinal vertical section through a battery made in accordance with my invention, one of the plate straps and the adjacent part of the cover member being shown in elevation.
Figure 3:
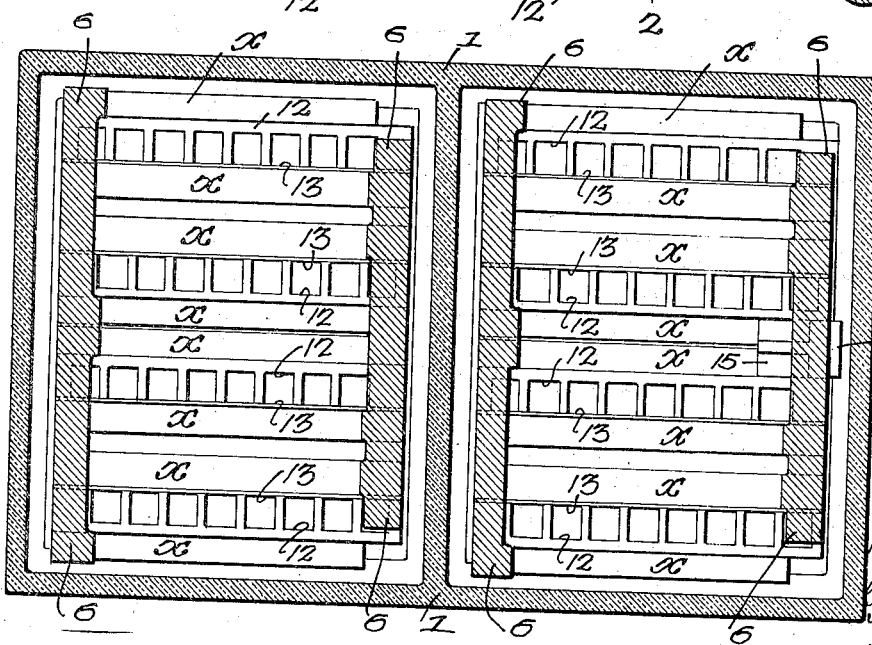
Fig. 3 is a section on the line 3—3, Fig. 1, also showing one end of a plate strap and adjacent portion of the cover member in elevation.

The positive and negative plates are suspended in each instance from a plate strap 6 which extends substantially the length of the cell, see Fig. 3, and which is provided in each instance with a longitudinal side recess 7 adapted for the reception of a horizontal extension or ledge 8 extending outwardly from the bottoms of the side flanges 4 of the cover member 3, as shown in Fig. 1. In this manner, the elements interlock with the cover member forming a joint sufficiently tight to keep sealing compound from running into the cell. The straps 6 are also in each instance provided with a laterally extending longitudinal flange 9 opposite the said recess 7, which flange extends substantially to the side walls of the container, also as shown in Fig. 1. The flange 9 also is extended around the ends of the straps, and since the under face of the flanges is in the same horizontal plane as the under face of the cover member 3, the end flanges of the straps project over and rest upon the shoulder 2 of the jar 1, the plates $x$ being thereby securely suspended at a distance above the bottom of the jar. Between the side walls of the container and the side flanges 4 of the cover member 3, there is formed, completely around the latter, a channel for reception of a sealing compound 10, the straps 6 forming the bottoms of the channels along the sides of the container. The elements of opposite polarity also comprise upwardly extending posts 11 which project at the top above the sealing compound 10, in which they are embedded, to form the terminal posts of the battery. Between the end flanges 5 of the cover and the upper side walls of the container, there is also formed a channel, which is a continuation of the previously described channel at the sides, and this channel also receives the sealing compound 10, as shown in Fig. 2, whereby a complete seal is formed between the said cover element and the sides of the container.

By reference to Fig. 2, it will be noted that the outside negative plates slant slightly to conform to the slant of the inner walls of the glass container and that the outer separators and positive plates lie parallel to these outside negative plates. This arrangement has the advantage that the active material of the outer negative plates is kept from blistering and breaking away from the body of the plate by the proximity to it of the jar wall at all points and that acid space is provided between each pair of positive plates.

By means of the aforedescribed construction, the elements of opposite polarity, comprising the plates $x$, are suspended in the container from the cover and at a desired distance above the bottom of the container, and the separators or plate insulators 12 and 13 are preferably sufficiently long to extend completely to the bottom as well as a certain distance above the tops of the plates to the under side of the straps 6. Also, owing to the fact that the plates are staggered or offset so that the vertical edge at the side where the plate joins the strap is in close proximity to the jar wall, a plate cannot be thrown out of line appreciably by the action of gravity on its overhanging main portion.

Also as well shown in Fig. 4, the plates $x$ are so proportioned and arranged that in each case one edge stops an appreciable distance short of the wall of the container toward which it extends, while the said insulators 12 and 13 are preferably sufficiently wide to extend practically the full width of the container. In this manner, the vertical edges of plates of opposite polarity are arranged in staggered relation, and the minimum distance between the vertical edges of the plates of opposite polarity is increased, thus effectively preventing loosened active material from bridging or treeing across the edges of the separators and partially short-circuiting the plates.

This staggered arrangement of the elements also provides between the outer edges of certain of said plates and the wall of the container a recess which may be utilized for installing a device for indicating the state of charge of the battery. Such a device I have illustrated in Figs. 1, 3 and 4, and may consist for example of a cage 14 so formed as to fit in the space between the edges of the plates and the adjacent wall of the container or jar and between the two immediately adjacent plate insulators or spacers. This cage 14 has in the present instance a laterally projecting lug or flange 15 at the top which extends over the top of the plates as shown in Figs. 1 and 3. The cage is adapted to hold for limited vertical movement one or more balls 16 of predetermined density and of material insoluble in the electrolyte. It is apparent that by the staggered arrangement of the plates hereinbefore described, I am able to employ an indicator of this type without increasing the normal size or changing the regular shape of the jar.

It will further be noted that instead of using, as ordinarily, interior single plates of extra thickness with special thin outside plates, the interior plates are made up of pairs of separate plates of normal thickness, the outside plates being also of normal thickness, but single, and I thus balance the plate capacities exactly throughout each of the cells without resorting to the special outside plates.

In Fig. 5, I have illustrated a modification of the aforedescribed construction in which the terminal posts extend through the cover member 17, that part of the said member through which the posts extend being made of extra thickness, and the posts being molded into these parts of extra thickness whereby the cover member becomes in effect a permanent part of the elements of opposite polarity. The arrangement has the double advantage of forming a superior seal positively preventing escape of acid by creepage at the post and also providing for the post a firm foundation enabling it to withstand considerable strain at the exposed end without danger of becoming loose and destroying the seal. This construction is particularly valuable for that type of terminal post which comprises a spring clip or binding post for retaining the connecting wires. Owing to the strains imposed when connecting or disconnecting wires, such terminals require more rigid support than is given by the ordinary sealing compound.

I claim:

1. A battery cell comprising a container having ledges; a non-conducting cover member supported upon said ledges in the top of said container; and plate groups of opposite polarity interlocked with the edges of said member and suspended therefrom in the container from the ledges.

2. A battery cell comprising a container having internal shoulders at the top; a cover member supported on said shoulders and having at the lower edges thereof transversely projecting flanges which at the opposite sides of the container are spaced apart from the side walls of the latter; plates of opposite polarity; straps connecting the plates of the same polarity together, each of said straps resting at its ends upon said shoulders and having in the side thereof a longitudinal recess into which the opposite flanges of the cover member are adapted to fit to form an interlocking connection between the cover and the plate elements, and said straps when interlocked with the cover member filling the space between the flanges of the latter and the side walls of the container; a sealing compound sealing the joint between the cover and the sides of the container and overlying the straps; and a terminal element attached to each of said straps and projecting upwardly through the said sealing compound.

3. A battery cell comprising a container having interior shoulders in at least one pair of opposite sides, positive and negative plate groups including straps the extremities of which are supported on said shoulders and from which the plates are suspended, each of said straps having connection with the plates of its group adjacent one vertical edge of the individual plates, with all of the plates substantially uniformly positioned with respect to the strap, the length of the plates in the transverse direction being less than the corresponding dimension of the container, and said straps being positioned in the container so that the vertical edges of the plates of the respective groups adjacent to the straps lie closely adjacent the opposite side walls of the container, and a cover member also supported on said shoulders intermediate the said straps and interlocked with the latter along the contiguous edges.

4. A battery cell comprising a container having shoulders on the inner surface of at least two opposite walls thereof; a non-conducting cover member adapted to rest upon said shoulders; plate groups of opposite polarity; straps connecting the plates of each group and adapted at each end to overlie and rest upon said container shoulders; interlocking means upon the cover member and said straps, said straps being of sufficient width to substantially fill the space between the sides of said cover member with which they interlock and the adjacent wall of the container.

WALTER E. HOLLAND.